(12) United States Patent
Kitajima (10) Patent No.: US 7,627,782 B2
(45) Date of Patent: Dec. 1, 2009

(54) MULTI-PROCESSING SYSTEM AND MULTI-PROCESSING METHOD

(75) Inventor: Nobukatsu Kitajima, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 368 days.

(21) Appl. No.: 11/270,518

(22) Filed: Nov. 10, 2005

(65) Prior Publication Data

US 2006/0117218 A1    Jun. 1, 2006

(30) Foreign Application Priority Data

Nov. 12, 2004   (JP)   ............................ 2004-329667

(51) Int. Cl.
    *G06F 11/00*   (2006.01)
(52) U.S. Cl. .......................................... 714/13; 714/15
(58) Field of Classification Search .................. 714/13, 714/15
    See application file for complete search history.

(56) References Cited

U.S. PATENT DOCUMENTS

| 6,738,926 | B2 * | 5/2004 | Mathiske et al. | ............... 714/15 |
| 6,792,559 | B1 * | 9/2004 | Cohen et al. | .................... 714/15 |
| 7,343,476 | B2 * | 3/2008 | Floyd et al. | .................. 712/216 |
| 2002/0066005 | A1 * | 5/2002 | Shibayama et al. | .......... 712/218 |
| 2006/0010344 | A1 * | 1/2006 | Zorek et al. | .................... 714/13 |
| 2008/0046782 | A1 * | 2/2008 | Betancourt et al. | ............ 714/38 |

FOREIGN PATENT DOCUMENTS

| JP | 7-287064 A  | 10/1995 |
| JP | 9-223035 A  | 8/1997  |
| JP | 10-116261 A | 5/1998  |
| JP | 10-247185 A | 9/1998  |

OTHER PUBLICATIONS

Tanenbaum, Andrew S. "Modern Operating Systems, 3rd Edition" 2008, pp. 95-117, 155,156.*

* cited by examiner

*Primary Examiner*—Bryce P Bonzo
(74) *Attorney, Agent, or Firm*—Sughrue Mion, PLLC (57) ABSTRACT

To provide a multi-processing system capable of continuing an operation with efficiency even if a failure occurs in a processor during a system operation. A multi-processing system according to an embodiment of the invention includes: a memory storing a program and information necessary for executing the program; a processor manager reading the program from the memory, dividing the read program into threads with priority, and assigning the threads to at least two processors based on the priority of the threads and a processing state of each processor; the at least two processors executing the threads assigned by the processor manager; and a processing data manager storing information necessary for executing the thread assigned by the processor manager, and outputting the stored information necessary for executing the assigned thread to the memory if a failure occurs in one of the processors.

12 Claims, 7 Drawing Sheets

| PROCESSOR ID | PROCESSING STATE | PROCESSING START DATE AND TIME |
|---|---|---|
| 0 | PROCESSING | 2004/7/8 16:30 |
| 1 | PROCESSING | 2004/7/9 16:33 |
| 2 | IN FAILURE | |
| 3 | READY FOR PROCESSING | |
| 4 | PROCESSING | 2004/7/9 16:27 |

```
1: void th1() {
     obj1.contents = 1 + 2;
     obj1.full = 1;
   }

2: void th2() {
     int tmp = 3 + 4;
     while (obj1.full == 0) {};
     return obj1.contents * tmp;
   }
```

Fig. 5

| PROCESSOR ID | PROCESSING STATE | PROCESSING START DATE AND TIME |
|---|---|---|
| 0 | READY FOR PROCESSING | |
| 1 | READY FOR PROCESSING | |
| 2 | READY FOR PROCESSING | |
| 3 | READY FOR PROCESSING | |
| 4 | READY FOR PROCESSING | |

Fig. 6

| PROCESSOR ID | PROCESSING STATE | PROCESSING START DATE AND TIME |
|---|---|---|
| 0 | PROCESSING | 2004/7/9 16:30 |
| 1 | PROCESSING | 2004/7/9 16:30 |
| 2 | READY FOR PROCESSING | |
| 3 | READY FOR PROCESSING | |
| 4 | READY FOR PROCESSING | |

Fig. 7

| PROCESSOR ID | PROCESSING STATE | PROCESSING START DATE AND TIME |
|---|---|---|
| 0 | IN FAILURE | |
| 1 | PROCESSING | 2004/7/9 16:30 |
| 2 | PROCESSING | 2004/7/9 16:31 |
| 3 | READY FOR PROCESSING | |
| 4 | READY FOR PROCESSING | |

Fig. 8

| PROCESSOR ID | PROCESSING STATE | PROCESSING START DATE AND TIME |
|---|---|---|
| 0 | IN FAILURE | |
| 1 | READY FOR PROCESSING | |
| 2 | PROCESSING | 2004/7/9 16:31 |
| 3 | READY FOR PROCESSING | |
| 4 | READY FOR PROCESSING | |

Fig. 9

1: tmp = 1 + 2
2: a = tmp * 3
3: tmp = 4 + 5
4: b = tmp * 6
5: c = a + b

MULTI-PROCESSING SYSTEM AND MULTI-PROCESSING METHOD

BACKGROUND OF THE INVENTION

1. Field of the Invention

The present invention relates to a multi-processing system and a multi-processing method. In particular, the invention relates to a multi-processing system and a multi-processing method, which can deal with an occurrence of a failure in a processor.

2. Description of Related Art

A multi-processing for executing processings in parallel by use of multiple processors secures high speed and safety level beyond an ability of a single processor. Thus, such multi-processing has attracted attentions in recent years. In particular, the multi-processing has gained attentions in that threads are assigned to multiple processors and executed thereby to carry out processings in parallel and enhance throughputs.

A multi-processor is significant for not only high-speed processing due to parallel processing but a high safety level in that when a failure occurs in one processor, the other processor not suffering a failure takes over the processing. However, a thread assigned to one processor may depend on a procedure or result of executing a thread assigned to the other processor. Hence, only through the re-execution of the thread assigned to the processor suffering from a failure by use of the other processor, the thread cannot necessarily be executed normally. To that end, various techniques for improving the processing speed and safety level of the multi-processing are being under study.

From the viewpoint of increasing the processing speed, there has been proposed a method of checking the number of operable processors and the number of memories for each cluster at the time of start-up for scheduling (see Japanese Unexamined Patent Publication No. 7-287064, for example). Further, from the viewpoint of enhancing the safety level, there has been proposed a method that can separate a processor suffering a failure without stopping a system (see Japanese Unexamined Patent Publication No. 10-247185).

However, the method disclosed in Japanese Unexamined Patent Publication No. 7-287064 cannot deal with the case where a failure occurs in a processor during a system operation. In addition, the method disclosed in Japanese Unexamined Patent Publication No. 10-247185 has a problem of poor workability because a user needs to start over from the beginning of the processing in case of failure.

As mentioned above, the conventional multi-processing system has a problem that it is impossible to deal with the case where a failure occurs in a processor during a system operation, or a problem of poor workability because a user needs to start over from the beginning of the processing in such a case.

SUMMARY OF THE INVENTION

A multi-processing system according to an aspect of the invention includes: a memory storing a program and information necessary for executing the program, a plurality of processors executing assigned threads, a processor manager reading the program from the memory, dividing the read program into threads, and assigning the threads to the plurality of processors based on priorities of the threads and a processing state of each processor, and a processing data manager storing information necessary for executing the threads assigned by the processor manager, and outputting the stored information necessary for executing the assigned threads to the memory if a failure occurs in one of the processors. With such a configuration, if a failure occurs in a processor, information stored in the processing data manager is output, so another processor can take over the processing.

A multi-processing method according to another aspect of the present invention includes: reading a program from a memory, dividing the read program into threads, assigning the threads to a plurality of processors based on priorities of the threads and a processing state of each processor, storing information necessary for each of the processors to execute the assigned thread, providing the stored information necessary for a processor to execute the assigned thread, if a failure occurs in one of the processors, to a processor not suffering a failure, and executing a processing of the processor suffering the failure with the processor not suffering the failure. According to this method, when a failure occurs in a processor, stored information is output, so another processor can take over the processing.

A multi-processing method according to another aspect of the present invention includes: a first processor for executing an assigned thread of a program; a second processor for taking over the processing of the first processor using temporarily saved information which is based on execution of the thread assigned for the first processor, when a failure occurs in the first processor. According to this method, when a failure occurs in a processor, another processor can take over the processing.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments.

First Embodiment

Figure 1:
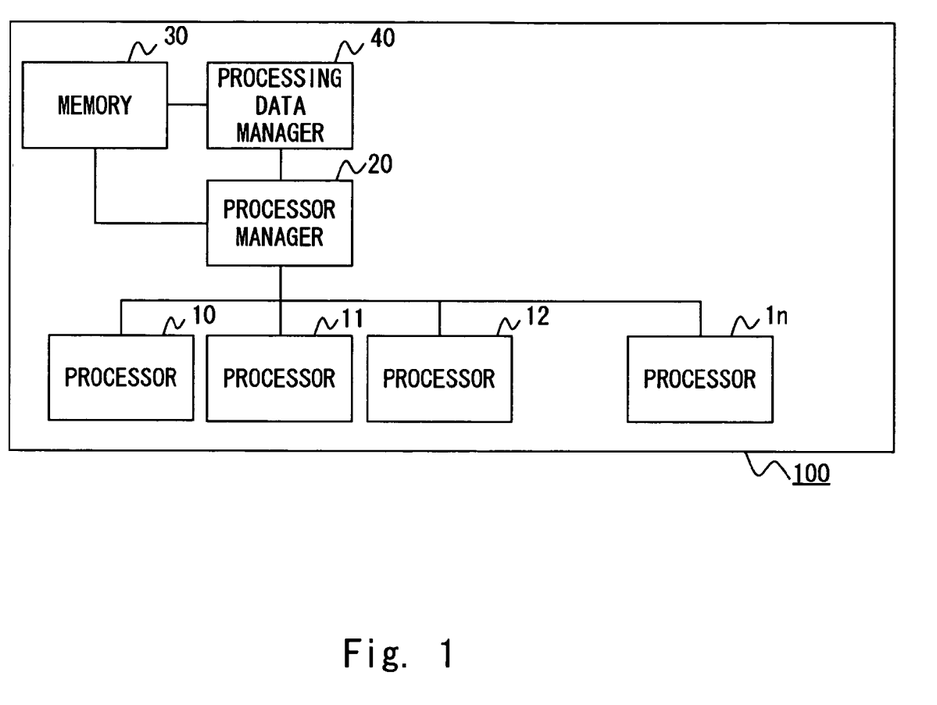
FIG. 1 is a block diagram showing the configuration of a multi-processing system according to an embodiment of the present invention.

FIG. 1 is a block diagram showing the configuration of a multi-processing system according to the present invention. A multi-processing system 100 of the present invention includes (n+1) processors 10 to 1n where n is a natural number not less than 0, a processor manager 20, a memory 30, and a processing data manager 40.

The processors 10 to 1n have an ability to execute threads, for example, central processing units (CPUs). The memory 30 is a storage device for storing program or data upon executing the program.

The processor manager 20 is a scheduler for assigning threads to (n+1) connected processors 10 to 1n. The processor manager 20 is connected with each processor, the memory 30, and the processing data manager 40.

The processing data manager 40 manages information necessary for the processors 10 to 1n to execute the threads. As an example of such information, information stored in the memory 30 at this time is given, such as data necessary for processing. In this case, the processing data manager 40 copies and stores the data necessary for processing currently stored in the memory 30. The information may be stored in a special storage device in the processing data manager 40 or in another external memory. The information stored in the memory 30 at this time is called a "snap shot of the memory 30".

Figure 2:
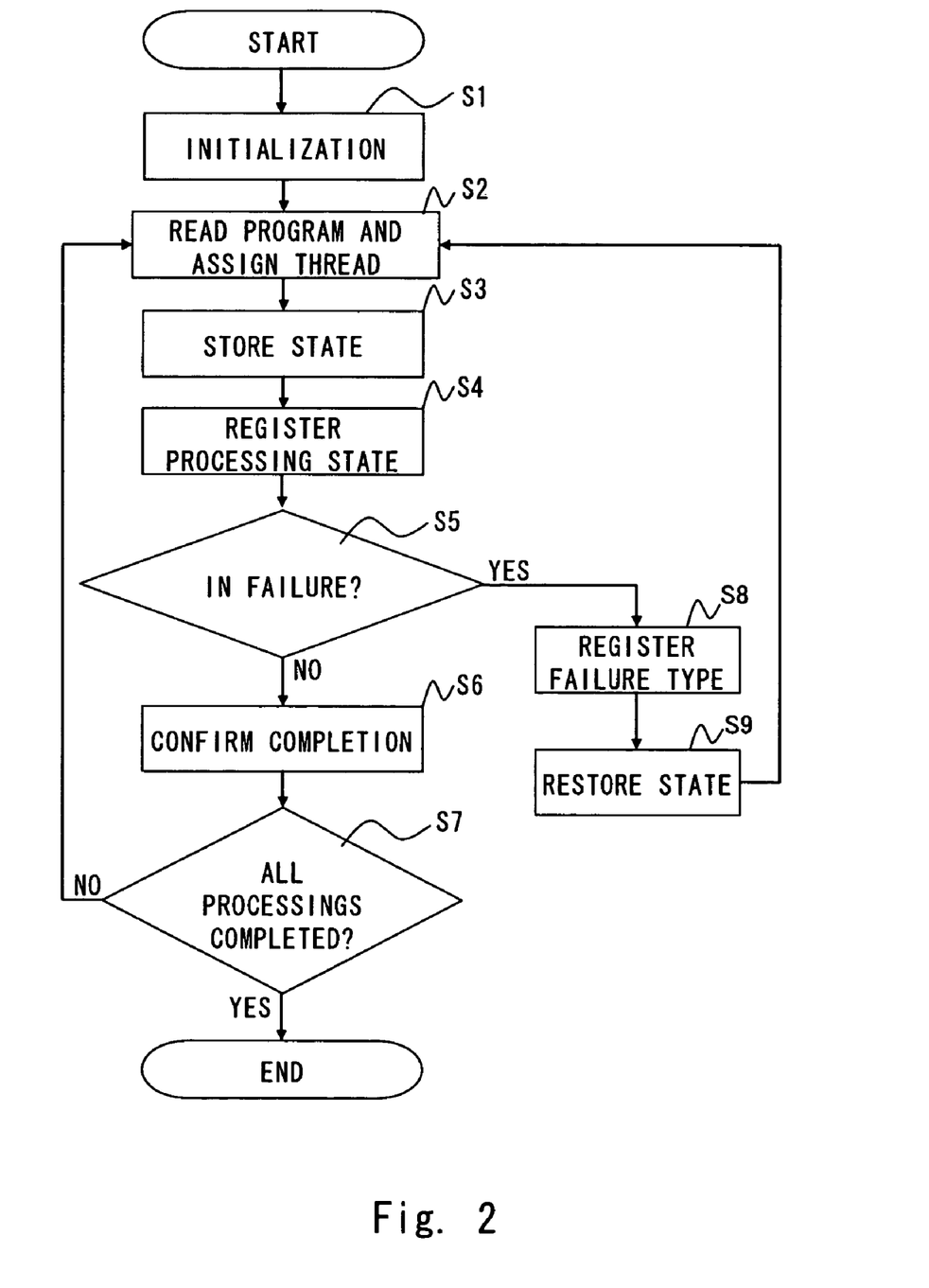
FIG. 2 is a flowchart showing a processing flow of the multi-processing system according to the embodiment of the present invention.

Referring next to a flowchart of FIG. 2, the processing flow of the multi-processing system 100 according to the embodiment of the present invention is described. It is assumed that a program executed by a processor is prestored in the memory 30.

Figure 3:
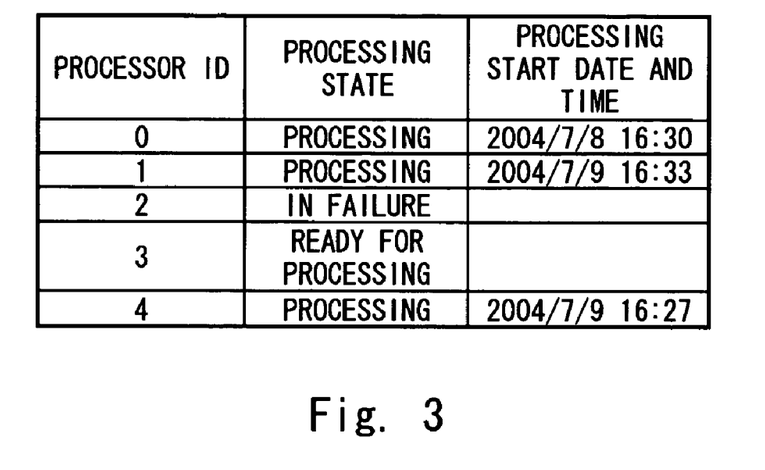
FIG. 3 shows a processing state example of each processor according to the embodiment of the present invention.

First of all, the entire system is initialized (S1). The processing data manager 40 detects and records a state of each processor. FIG. 3 shows an example of a processing state of each processor. The operational states are categorized into "ready for processing", "processing", and "in failure". A processor ID is an identification number unique to each processor. The initial state is, in principle, "ready for processing". However, if it is confirmed that a failure has occurred in a processor as a result of executing another program beforehand, the initial state is "in failure". The information may be recorded on an additional storage device in the processor manager 20 or on the memory 30.

Next, the processor manager 20 reads a program from the memory 30 (S2). The program is divided into threads with priorities. The processor manager 20 assigns the threads to each processor based on the priorities assigned of the threads of the received program and the state of each processor.

After the process or manager 20 has assigned all the threads to each processor, the processing data manager 40 records information necessary for each processor to execute the corresponding thread (S3). The information necessary for executing the threads is not particularly limited, and may be a snapshot of the memory 30. The information recorded at this time is used for another processor to execute the processing when a failure occurs in the original processor. The processing data manager 40 may record the information on a storage device provided in the processing data manager 40 or an additionally connected storage device.

After having recorded the necessary information, the processing data manager 40 updates and records the state of each processor (S4). At this time, if the processor manager 20 assigns a thread to a processor which is "ready for processing", the state is set as "processing" to record the processing start time.

Upon the completion of updating the state of each processor, the processing data manager 40 determines whether a failure occurs in each processor or not (S5). The determination method is not particularly limited, and the following method may be adopted, for example. That is, a processing time is calculated in advance, and if the processor in operation is not restored to a state ready for processing even after the elapse of such a predetermined period, it is determined that a failure occurs; otherwise, it is determined that no failure occurs.

When the determination result shows that no failure occurs, the processing data manager 40 confirms the completion of the processings of each processor, and changes the state of the processor the processing of which is completed from "processing" to "ready for processing" (S6).

The processing data manager 40 checks whether all the processings are completed after the state change or not (S7) Along with the completion of all the processings with the processors, the overall operation is completed. If not completed, the next program is read from the memory 30.

The determination result shows that a failure occurs, the processing data manager 40 changes the state of a processor determined to suffer a failure from "processing" or "ready for processing" to "in failure" (S8).

After completing the state change, the processing data manager 40 discards all threads that were being executed upon the failure and reads the recorded snapshot of the memory 30 in step S3 and rewrite the data (S9). In this case, if plural snap shots are recorded, restored is the oldest snapshot including the threads that were executed at the time when the failure occurred. At the completion of the rewriting, the processor manager 20 reads a program from the memory again to reassign threads to the processors.

In this way, the necessary operational state of each processor is recorded, and rewritten in case of failure, whereby even if a failure occurs in a processor, the remaining processors can take over its processing without any problem and need to restart the program from the beginning.

Figure 4:
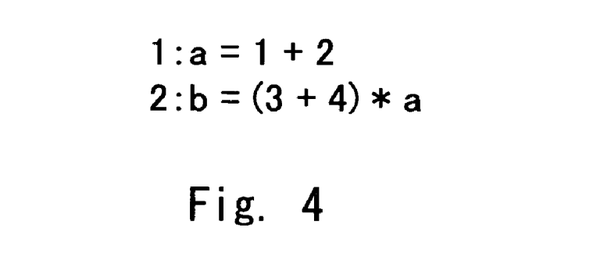
FIG. 4 shows an example of a program executed by the multi-processing system according to the embodiment of the present invention.

Subsequently, a description is given of the processing of the multi-processing system when a failure occurs during the processor's processing, taking a program as a specific example. FIG. 4 shows an example of a program executed by the multi-processing system according to the present invention.

Reference symbols "a" and "b" in the program of FIG. 4 denote variables of integer type. The first line of the program shows a processing of calculating (1+2), and setting the calculation result as the variable "a". The second line of the program shows a processing of calculating (3+4), and multiplying the addition result by the variable "a" on the first line to store the multiplying result as the variable "b".

Figure 5:
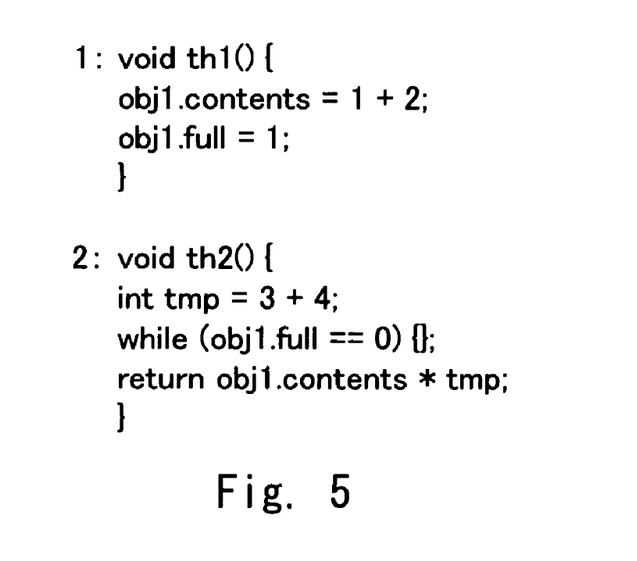
FIG. 5 shows an example of how a program executed by the multi-processing system according to the embodiment of the present invention is divided into threads.

FIG. 5 shows a program for executing threads obtained by dividing the program of FIG. 4. The program of FIG. 4 is divided into two threads, void th1( ) and void th2( ). Here, void th1( ) is referred to as a thread 1, and void th2( ) is referred to as a thread 2. A program based on the thread 1 is described first. In FIG. 5, "obj1" refers to an object composed of "contents" and "full", and the "contents" is a variable set to a corresponding value. The "full" is also variable, but is used as a flag, so the "full" of 0 indicates that the processing is not completed, and the "full" of 1 indicates that the processing is completed. On the first line, (1+2) is calculated and the addition result is set as the variable "contents". On the second line, 1 is substituted into the variable "full" for indicating that the calculation is completed.

Next, a program based on the thread 2 is described. In FIG. 5, "tmp" is a local variable of an integer type used only for the processing of the thread 2. On the first line, (3+4) is calculated, and the addition result is set as the variable "tmp". On the second line, in order to confirm whether the processing of the thread 1 is completed or not, during such a period that the "obj1.full" is set as 0, an idle processing is repeated. If the "full" is set to 1, this thread can be shifted to the processing on the third line. On the third line, a value of "obj1.contents" is multiplied by the local variable "tmp" to return the multiplying result. By dividing the program into the threads this way, the program shown in FIG. 4 is executed.

During the above processing, the thread 2 makes reference to the thread 1 on the second and third lines. In other words, this reveals the dependence between the threads 1 and 2, i.e., reveals that the value written by the thread 1 is utilized by the thread 2. This dependence is called a read after write (RAW) dependence. In such a case, if a failure occurs in a processor during the execution of the thread 1, and the thread 1 is re-executed, the thread 2 should be also executed again. That is, the thread 1 and the thread 2 cannot be executed in reverse order.

Figure 6:
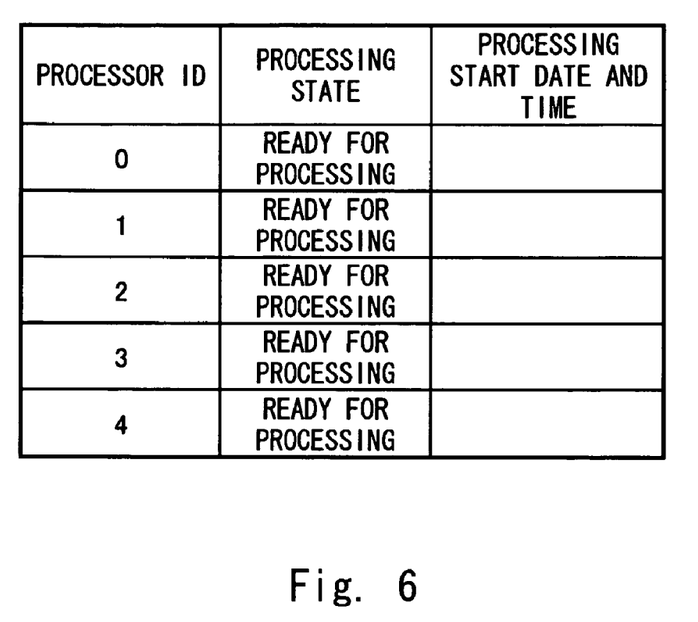
FIG. 6 shows a processing state example of each processor according to the embodiment of the present invention.

A description is given of the case where the program is executed in accordance with the processing flow of the flowchart of FIG. 2. The program is divided into two threads, the thread 1 and the thread 2 as shown in FIG. 5 and stored in the memory 30. FIG. 6 shows initial states of each processor as a result of the initialization (S1).

First of all, the processor manager 20 reads a thread-based program from the memory 30 (S2). After that, the processor manager 20 assigns a thread to each processor. In this case, the threads 1 and 2 are assigned to the processors 10 and 11, respectively.

After the processor manager 20 has assigned a thread to each processor, the processing data manager 40 stores the snapshot of the memory 30 (S3). The information necessary for executing the program is all stored in the memory 30, so if the snapshot of the memory 30 is recorded, the operation can be repeated from this point.

Figure 7:
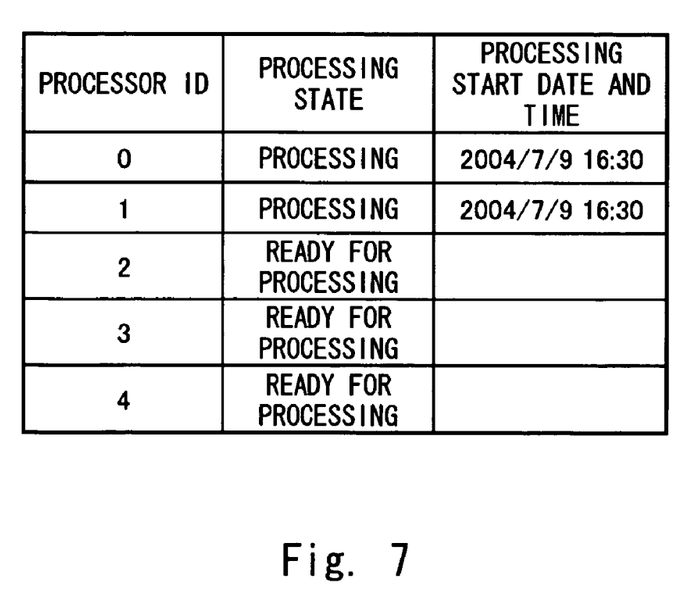
FIG. 7 shows a processing state example of each processor according to the embodiment of the present invention.

At the completion of recording the snapshot of the memory 30, the processing data manager 40 updates and records the state of each processor (S4). FIG. 7 shows the state of each processor at this time.

At the completion of updating the state of each processor, the processing data manager 40 determines whether a failure occurs in each processor or not (S5). Now, a description is made of the case where the processor 10 is determined to suffer a failure. When a failure occurs in the processor 10, the processing data manager 40 rewrites the state of the processor 10 from "processing" to "in failure" (S8).

At the completion of rewiring, the processing data manager 40 discards all the threads in execution. After that, the processing data manager 40 rewrites the recorded snapshot of the memory 30 to the memory 30 (S9), and then reads the next program from the memory (S2).

The processor manager 20 reads the thread-based program from the memory 30 to assign the threads to processors respectively. At this time, since the processor 10 is "in failure", the threads 1 and 2 are assigned to the processors 11 and 12, respectively.

Figure 8:
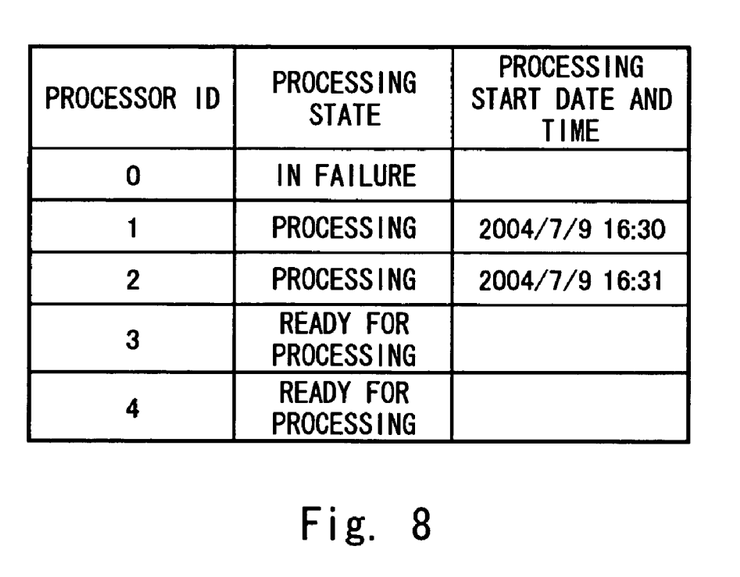
FIG. 8 shows a processing state example of each processor according to the embodiment of the present invention.

After the processor manager 20 has reassigned the threads to each processor, the processing data manager 40 records information necessary for each processor's operation (S3), and updates and records the state of each processor (S4). This processing is the same as the first processing. FIG. 8 shows the state of each processor at this time.

At the completion of updating the state of each processor, the processing data manager 40 determines whether a failure occurs in each processor or not (S5). In this case, it is determined that no failure occurs. The processing data manager 40 confirms the completion of the processing of each processor, and changes the state of the processor the processing of which is completed from "processing" to "ready for processing" (S6).

The processing data manager 40 determines whether all the processings are completed after the state change or not (S7). If the processings are completed, the program is terminated.

As a result of the termination in step S7, if all the processings are not completed, the threads are assigned again (S2). At this time, assuming that the processor 11 for executing the thread 1 has completed the processing, and the processor 12 for executing the thread 2 has not yet completed the processing, no thread remains to be executed, so a thread is no longer assigned.

Figure 9:
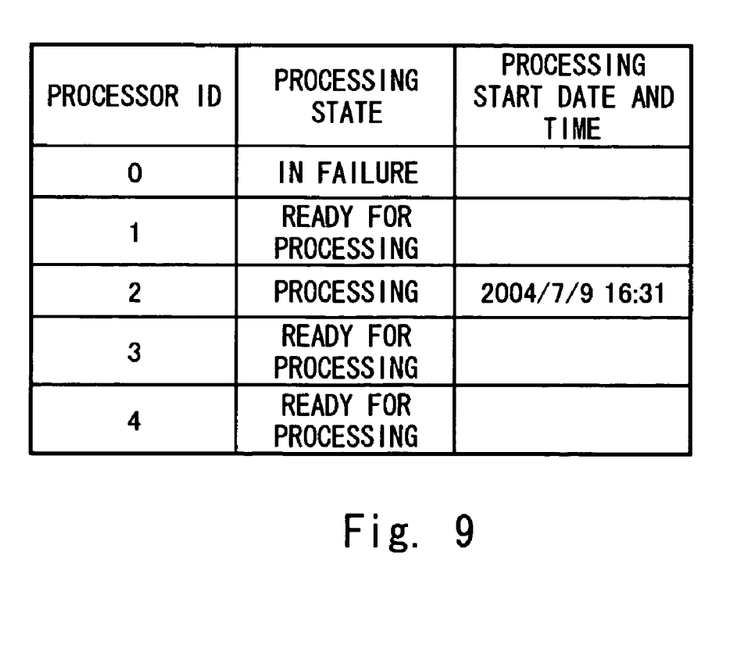
FIG. 9 shows a processing state example of each processor according to the embodiment of the present invention.

Next, the processing data manager 40 records the snapshot of the memory 30 (S3), and updates and records the state of each processor (S4). FIG. 9 shows the state of each processor.

At the completion of updating the state of each processor, the processing data manager 40 determines whether a failure occurs in each processor or not (S5). At this time, when the processor 12 is determined to suffer a failure, the processing data manager 40 rewrites the state of the processor 12 from "processing" to "in failure" (S8).

After the completion of rewriting, the processing data manager 40 discards the thread 2 in execution. After that, the processing data manager 40 returns the recorded snapshot to the memory 30 (S9). In this case, if plural snapshots are stored, returned is the oldest snapshot including the thread that was being executed at the time when the failure occurred. In the above case, the processor suffering a failure is executing the thread 2, and a desired snapshot is the oldest snapshot including the thread 2, so the snapshot just before the execution of the threads 1 and 2, is restored, not a snapshot at the completion of the thread 1.

In this way, a snapshot is restored to the one just before a thread executed by a processor suffering a failure, making it possible to minimize the number of times the thread is re-executed without analyzing the dependence among the threads. After the snapshot is restored to a desired value, another program is read again (S2).

The processor manager 20 reads the thread-based program from the memory 30 to assign the threads to each processor. At this time, the thread 1 is assigned to the processor 11, and the thread 2 is assigned to the processor 13 since the processor 12 is "in failure".

After the processor manager 20 has reassigned the threads to each processor, the processing data manager 40 records the snapshot of the memory 30 (S3), and updates and records the state of each processor (S4). This processing is the same as the first one. From then on, similar processing is repeated to the end.

Thus, even if a failure occurs at any time within the operation, the remaining processors can take over the processing to normally terminate the program without any problem.

Figure 10:
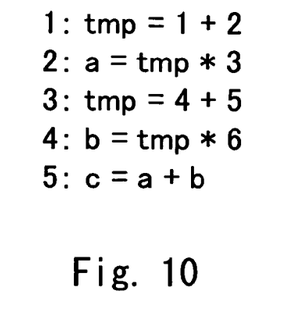
FIG. 10 shows an example of a program executed by the multi-processing system according to the embodiment of the present invention.

A description is given of the case where the program of FIG. 10 is run on the multi-processing system. In FIG. 10, "tmp", "a", "b", and "c" are variables of integer type.

On the first line, (1+2) is calculated, and the addition result is set as the variable "tmp". On the second line, the variable "tmp" preset on the first line is multiplied by 3 to set the multiplying result as the variable "3". On the third line, (4+5) is calculated to set the addition result as the variable "tmp". On the fourth line, the variable "tmp" preset on the third line is multiplied by 6 to store the multiplying result as the variable "b". On the fifth line, the variable "a" preset on the second line is added to the variable "b" preset on the fourth line to set the addition result as the variable "c".

Each line of the program may be assigned to a thread. For example, the first line is assigned to a thread 1, the second line is assigned to a thread 2, the third line is assigned to a thread 3, the fourth thread is assigned to a thread 4, and the fifth thread is assigned to a thread 5.

Considering the dependence among the threads, the thread 2 references the calculation result of the thread 1, so the RAW dependence exists. Likewise, the thread 4 has the RAW dependence upon the thread 3, and the thread 5 has the RAW dependence upon the threads 2 and 4.

Although the thread 3 does not reference the thread 2, if the thread 3 is executed prior to the thread 2, a value of the variable "tmp" is changed, so the system cannot normally operate. In short, a dependence also exists between the threads 2 and 3 in that the data is read by the thread 2 and then written by the thread 3. Such a dependence is called a write after read (WAR) dependence.

Similarly, although the thread 3 does not reference the thread 1, the variable "tmp" preset by the thread 1 is rewritten by the thread 3, so the threads 1 and 3 cannot be executed in reverse order, either. That is, there is dependence between the threads 1 and 3 in that the data written by the thread 1 is rewritten by the thread 3. This dependence is called a write after write (WAW) dependence.

In consideration of these RAW, WAR, and WAW dependences, only a thread that has the dependent relation with a thread executed by a processor can be re-executed when a failure occurs in the processor by analyzing the dependence between the threads and storing the analysis result as information. Further, it is necessary to trace the dependent relations between the threads in the event of failure of the processor. This is inefficient in view of a throughput as well as a storage capacity.

In contrast, the present invention only requires that a value of a memory is saved at the start of executing the thread, and the thread in execution is discarded in case of failure, and the value is rewritten to the oldest information including the thread that is being executed by a processor suffering a failure. Hence, the present invention does not require a large memory capacity and high-load analysis processing unlike the case of saving all the dependency relations between the threads of the program.

Second Embodiment

Figure 11:
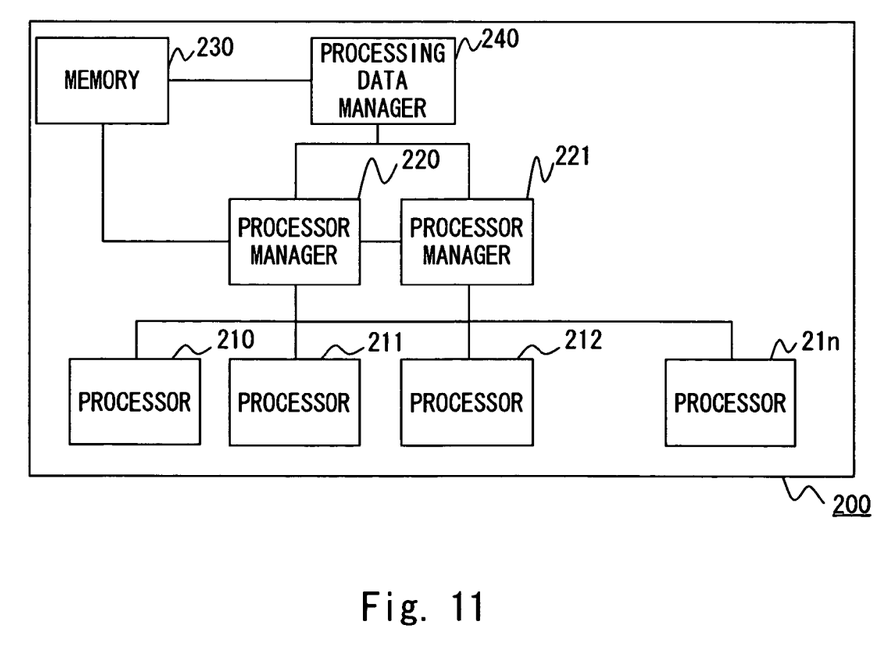
FIG. 11 is a block diagram showing the configuration of a multi-processing system according to another embodiment of the present invention.

One more processor manager may be added to the above configuration, and two processor managers may be provided in total. FIG. 11 is a block diagram showing the configuration of a multi-processing system according to a second embodiment of the present invention.

A multi-processing system 200 includes processor managers 220 and 221, and a processing data manager 240.

The processor manager 220 is a scheduler for assigning threads to (n+1) processors 210 to 21n connected therewith. The processor manager 220 is connected with each processor, a memory 230, and a processing data manager 240.

The processing data manager 240 manages data necessary for the processors 210 to 21n to execute the processings. The processing data manager 240 manages the data received from the connected processor manager 220. The processing data manager 240 monitors whether the processor manager 220 or the processor manager 221 normally operates or not, and switches the processor manager if either one does not normally operate.

The processors 210 to 21n have an ability to execute the threads, for example, central processing units (CPUs). The memory 230 is a storage device storing programs or data upon the execution of programs.

The processor manager 221 is an auxiliary manager, and has the function equivalent to the processor manager 220. During the normal operation, the processor manager 221 is put in a standby mode, and thus does not operate.

The normal operation of the processor manager 220 is the same as the first embodiment of the present invention, so its repetitive description is omitted here. A description is given of the processing flow in the case where a failure occurs in the processor manager 220.

Figure 12:
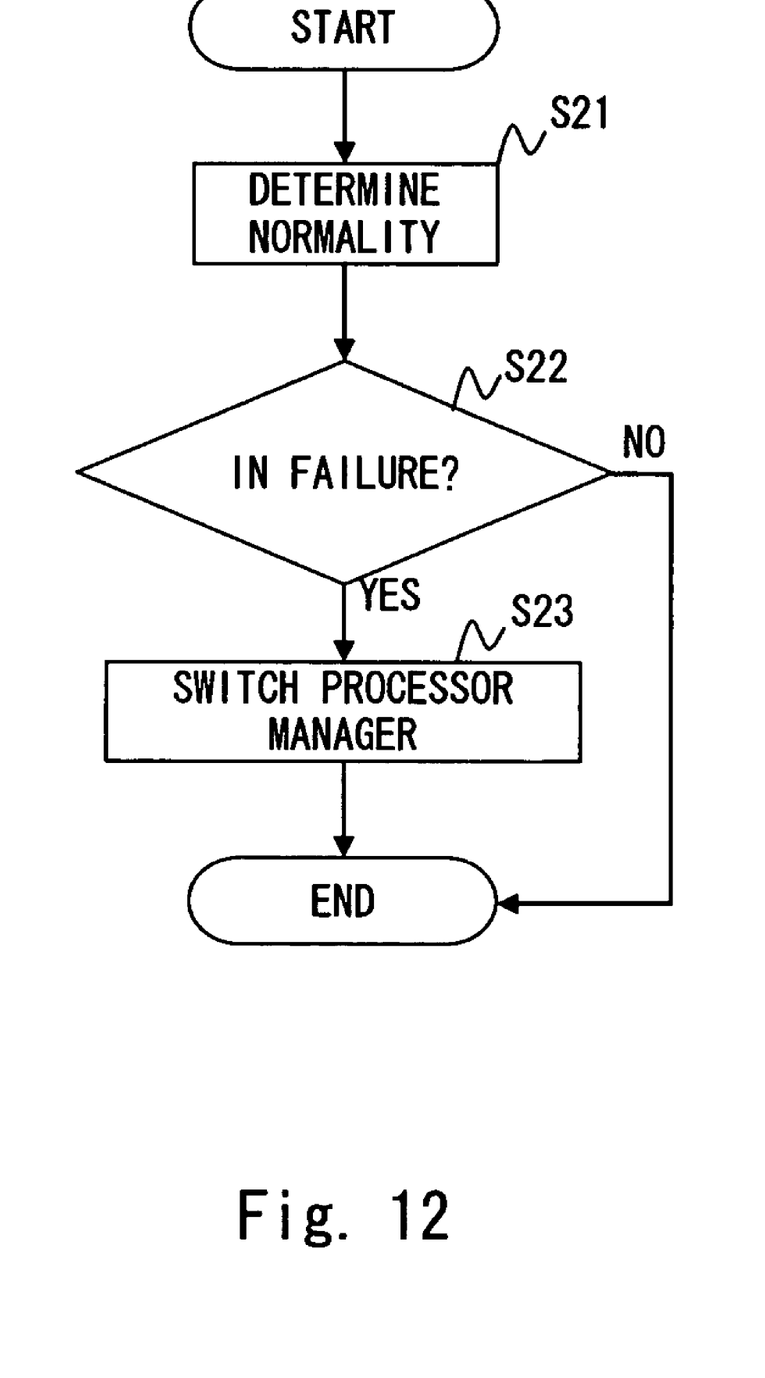
FIG. 12 shows a processing flow of the multi-processing system according to the embodiment of the present invention.

FIG. 12 is a flowchart showing a flow of monitoring and switching processings for the processor manager of the multi-processing system according to the present invention. First of all, the processing data manager 240 determines whether the processor manager normally operates or not (S21). The determination target is the processor manager 220 during the initial operation, and is the processor manager 221 if switched. The determination way is not particularly limited, and the following way may be adopted, for example. That is, a request signal is sent from the processing data manager 240 to the processor manager, and the operation is checked based on the response signal.

If the determination result reveals the abnormal operation, that is, reveals that a failure occurs in the processor manager (S22), the processing data manager 240 switches the operating processor manager from the processor manager 220 to the processor manager 221 (S23). If the processor manager 221 is operating, the processor manager 221 is switched to the processor manager 220.

At this time, if the information necessary for operating the processor manager is held in the processor manager 220, the information is sent to the processor manager 221. Alternatively, a storage device for storing the information necessary for operating the processor manager is prepared and connected with both of the processor managers 220 and 221.

In this way, the two processor managers are prepared, and switched from each other and put into operation when a failure occurs in either one. Thus, even if a failure occurs in the processor manager, the operation can be normally terminated.

Third Embodiment

In the second embodiment of the present invention, the two processor managers are provided. Also, two processing data managers could be provided. In this case, the processor manager determines whether the processing data manager normally operates or not. If determining that the processing data manager does not normally operate, the processor manager switches the operating processing data manager from a processing data manager to the other processing data manager. The third embodiment is the same as the second embodiment except the above. In this way, the two processing data managers are prepared, and switched from each other and put into operation when a failure occurs in either one. Thus, even if a failure occurs in the processing data manager, the operation can be normally terminated.

Other Embodiments

The second embodiment may be combined with the third embodiment to prepare two processor managers and two processing data managers and switch from one to another in case of failure. In this case, the processing data manager determines whether the processor manager normally operates or not and switches the managers, and the processor manager determines whether the processing data manager normally operates or not and switches processing data managers.

It is apparent that the present invention is not limited to the above embodiment that may be modified and changed without departing from the scope and spirit of the invention.

What is claimed is:

1. A multi-processing system, comprising:
   a first memory storing a program and information necessary for executing the program;
   a plurality of processors executing assigned threads;
   a processor manager reading the program from the first memory, dividing the program into threads, and assigning the threads to the plurality of processors based on priorities of the threads and a processing state of each processor; and
   a processing data manager storing in a second memory a plurality of information necessary for executing a plurality of the threads assigned by the processor manager, whenever the plurality of the threads are assigned to the plurality of processors, and extracting, when a failure occurs in one of the plurality of processors, information including information of a thread; that is processed at a time when the failure occurs from among the plurality of information from the second memory, and outputting the extracted information to the first memory.

2. The multi-processing system according to claim 1, wherein the information necessary for executing the threads is a snapshot of the first memory.

3. The multi-processing system according to claim 1, further comprising an auxiliary processor manager having a function equivalent to a function of the processor manager, wherein the processing data manager monitors a processing state of the processor manager, and activates, if determining that a failure occurs in the processor manager, the auxiliary processor manager.

4. The multi-processing system according to claim 1, further comprising an auxiliary processing data manager having a function equivalent to a function of the processing data manager, wherein the processor manager monitors a processing state of the processing data manager, and activates, if determining that a failure occurs in the processing data manager, the auxiliary processing data manager.

5. The multi-processing system according to claim 1, wherein:
   the processing data manager stores in the second memory each of the plurality of information at a time when its respective one of the plurality of the threads starts to be executed; and
   the processing data manager, when the failure occurs in one of the plurality of processors, discards the thread that is processed at the time when the failure occurs, extracts information including the information of the thread that is processed at the time when the failure occurs from among the plurality of information that are stored at the time when the thread starts to be executed, and outputs the extracted information to the first memory.

6. The multi-processing system according to claim 1, wherein:
   the processing data manager, when there are plural information including the information of the thread that is processed at the time when the failure occurs among the plurality of information, extracts oldest information among the plural information including the information of the thread that is processed at the time when the failure occurs from the plurality of information from the second memory, and outputs the extracted information to the first memory.

7. The multi-processing system according to claim 1, wherein:
   the processing data manager stores in the second memory each of the plurality of information at a time when its respective one of the plurality of the threads starts to be executed; and
   the processing data manager, when the failure occurs in one of the plurality of processors, discards the thread that is processed at the time when the failure occurs, extracts information including the information of the thread that is processed at the time when the failure occurs from among the plurality of information that are stored at the time when the thread starts to be executed, and outputs the extracted information to the first memory.

8. The multi-processing system according to claim 1, wherein:
   the processing data manager, when there are plural information including the information of the thread that is processed at the time when the failure occurs among the plurality of information, extracts oldest information among the plural information including the information of the thread that is processed at the time when the failure occurs from the plurality of information from the second memory, and outputs the extracted information to the first memory.

9. A multi-processing method, comprising:
   reading a program from a first memory;
   dividing the read program into threads;
   assigning the threads to a plurality of processors based on priorities of the threads and a processing state of each processor;
   storing in a second memory a plurality information necessary for the plurality the processors to execute a plurality of the assigned threads, whenever the plurality of the treads are assigned to the plurality of processors;
   extracting from the second memory, when a failure occurs in the plurality of processors, information including information of a thread that is processed at a time when the failure occurs from among the stored plurality of information; and outputting the extracted information the first memory; and
   executing a processing of the extracted information with a processor not suffering the failure.

10. The multi-processing method according to claim 9, wherein the information necessary for the processors is a snapshot of the first memory.

11. The multi-processing method according to claim 9, wherein the assigning of the threads is executed by a processor manager, and if it is determined that a failure occurs in the processor manager as a result of monitoring a processing state of the processor manager, an auxiliary processor manager having a function equivalent to the processor manager is activated.

12. The multi-processing method according to claim 9, wherein the information necessary for the processors is stored in a processing data manager, and if it is determined that a failure occurs in the processing data manager as a result of monitoring a processing, state of the processing data manager, an auxiliary processing data manager having a function equivalent to a function of the processing data manager is activated.

* * * * *